United States Patent [19]

Roberts et al.

[11] Patent Number: 5,029,416

[45] Date of Patent: Jul. 9, 1991

[54] ELECTRONIC BRAKE FOR LENS GENERATOR DEVICE

[76] Inventors: Tiner E. Roberts, 5675 - 398th St., Rice, Minn. 56367; Keith E. West, 4613 Edina Blvd., Edina, Minn. 55424

[21] Appl. No.: 491,975

[22] Filed: Mar. 12, 1990

[51] Int. Cl.⁵ .............................................. B24B 55/04
[52] U.S. Cl. ........................ 51/105 LG; 51/106 LG; 51/165.72; 82/118
[58] Field of Search ............... 51/271, 272, 284 R, 51/134.5 R, 165.72, 105 LG, 106 LG; 82/118, 142; 192/129 R, 129 A, 133

[56] References Cited

U.S. PATENT DOCUMENTS

| | | | |
|---|---|---|---|
| 4,137,677 | 2/1979 | Nedreski | 51/134.5 |
| 4,566,226 | 6/1986 | Kimura | 51/134.5 |
| 4,680,998 | 7/1987 | Council | 51/284 R |
| 4,768,308 | 9/1988 | Atkinson | 51/284 R |
| 4,850,152 | 7/1989 | Heynacher | 51/284 R |
| 4,901,478 | 2/1990 | Kane | 51/105 LG |
| 4,908,997 | 3/1990 | Field | 51/105 LG |
| 4,947,715 | 8/1990 | Council | 51/284 R |

*Primary Examiner*—Frederick R. Schmidt
*Assistant Examiner*—Blynn Shideler

[57] ABSTRACT

A lens generator device is provided with a dynamic electronic braking circuit for instantaneously interrupting operation of the lens generated under certain conditions to prevent injury to an operator. The lens generator includes a chamber structure having an access cover and having a power driven grinding tool therein. A photoelectric switch is mounted on the tailstock in confronting relation with the chamber structure cover and is operable when the cover is raised or when the tailstock is retracted to operate the dynamic braking circuit and instantaneously stop operation of the grinding tool.

5 Claims, 1 Drawing Sheet

ELECTRONIC BRAKE FOR LENS GENERATOR DEVICE

This invention relates to lens generator devices and, more particularly, to an electronic dynamic braking system for a lens generator device.

BACKGROUND OF THE INVENTION

In conventional lens generator apparatuses, the grinding and surface generation takes place in a grinding chamber into which a collet assembly of the tailstock projects. The collet assembly supports the lens blank; and the grinding chamber is provided with a cover plate, which permits access to the chamber. During operation of the lens generator apparatus, the lens blank sometimes becomes detached from the collet assembly; and some operators will attempt to retrieve the lens blank from the grinding chamber while the apparatus is in operation. An operator can be seriously injured if the operator's hand or arm inadvertently comes into contact with the high speed grinding tool. There are presently no asymmetrical lens generators whose operation may be instantaneously braked if the cover plate is opened or if the collet assembly is retracted.

SUMMARY OF THE INVENTION

It is an object of this invention to provide a novel, dynamic electronic braking system for a lens generating apparatus, which is operable to instantaneously break operation of the electric motor for the grinding tool if the grinding chamber cover plate is opened or if the collet assembly is retracted.

A more specific object of this invention is to provide a lens generator apparatus with a novel electronic braking system, including an optical sensing circuit electrically connected to a braking circuit, which is operable to produce a D.C. signal to cause instantaneous braking of the electric motor for the grinding tool in the event that the cover plate for the generating apparatus is raised or if the collet assembly is retracted.

In carrying out the invention, the lens generator apparatus is provided with an optical sensing circuit, which is electrically connected to the apparatus operating circuit. The optical sensing circuit includes a photoelectric cell switch, which is in circuit closing condition when the operating circuit is energized and the photoelectric switch is irradiating a photoelectric surface on the cover plate of the grinding chamber within the sensing focal length of the photocell switch. The photocell switch is mounted on the tailstock assembly so that the optical sensing circuit is opened when the cover plate is opened, or when the collet assembly is retracted a distance which exceeds the sensing focal length of the photoelectric switch. The photo sensing circuit is electrically connected to a braking circuit, which produces and transmits a D.C. signal to the electric motor when the optical circuit is opened to thereby instantaneously brake operation of the electric motor.

FIGURES OF THE DRAWING

FIG. 1 is a perspective view of the lens generating apparatus incorporating the novel, dynamic electronic braking system, with certain parts thereof illustrated in an adjusted position by a dotted line configuration; and FIG. 2 is a circuit diagram for the electric braking system for the lens generator apparatus.

DESCRIPTION OF THE PREFERRED EMBODIMENT

Figure 1:
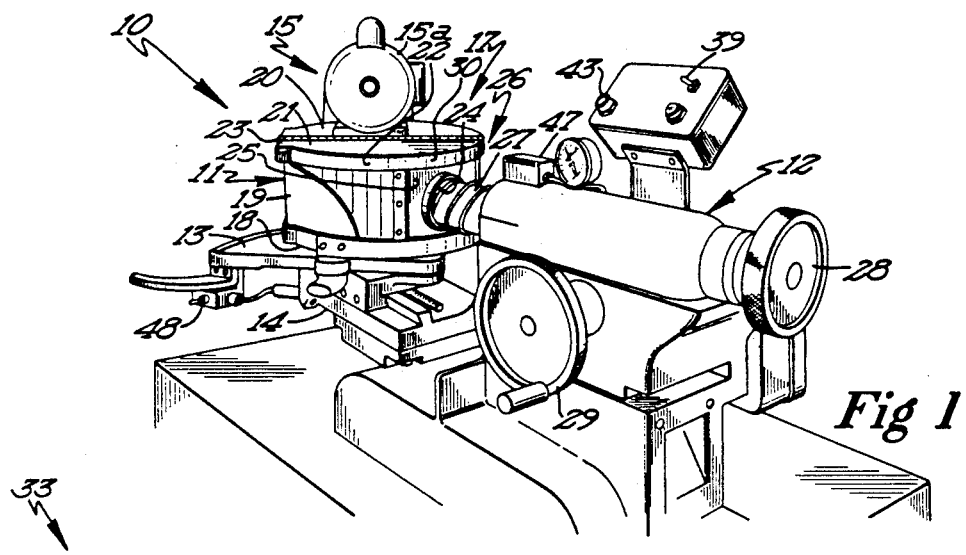

Referring now to the drawings and, more specifically, to FIG. 1, it will be seen that one embodiment of a commercial lens generating apparatus, designated generally by the reference numeral 10, is thereshown. The lens generator apparatus 10 is comprised of a grinding tool assembly and a tailstock 12 of well-known conventional construction. The grinding tool assembly includes a horizontally disposed table 13, which is pivotally mounted on a base 14 for pivotal movement relative to the base about a substantially vertical axis. The table is provided with a quill-type electric motor and a high speed spindle unit 15, which is operatively connected to a grinding tool 16. A cylindrically-shaped grinding chamber structure is also mounted on the table 13 for movement therewith.

The grinding tool projects into a cylindrical chamber structure 17, which includes a bottom wall 18, an upstanding peripheral wall 19, and a top wall 20, which has a cover plate 21 hingedly connected thereto by a hinge 23. The cover plate 21 has a generally arcuate flange 22 depending therefrom. The upstanding wall 19 of the chamber structure has an opening 24 therein and is provided with a curtain 25. It will be appreciated that, during the grinding operation, the housing pivotally moves along with the table relative to the base so that the grinding tool sweeps across the lens surface being generated. The curtain arrangement, which is well-known in lens generators, permits the sweeping action, while providing a part of the closure for the chamber structure 17.

The tailstock 12 includes a collet assembly 26, including a collet 27 to which the lens blank 31 is attached. A coarse adjustment wheel 28 advances and retracts the collet and lens blank supported thereon into and out of the chamber structure 17, while the fine adjustment wheel 29 permits finer adjustment of the position of the collet and lens blank within the chamber structure.

The outer surface of the arcuate flange 22 for the cover plate 21 defines a photoelectric surface 30, which, when irradiated by a photoelectric cell switch, closes an optical sensing circuit of the electronic dynamic braking system 33.

Figure 2:
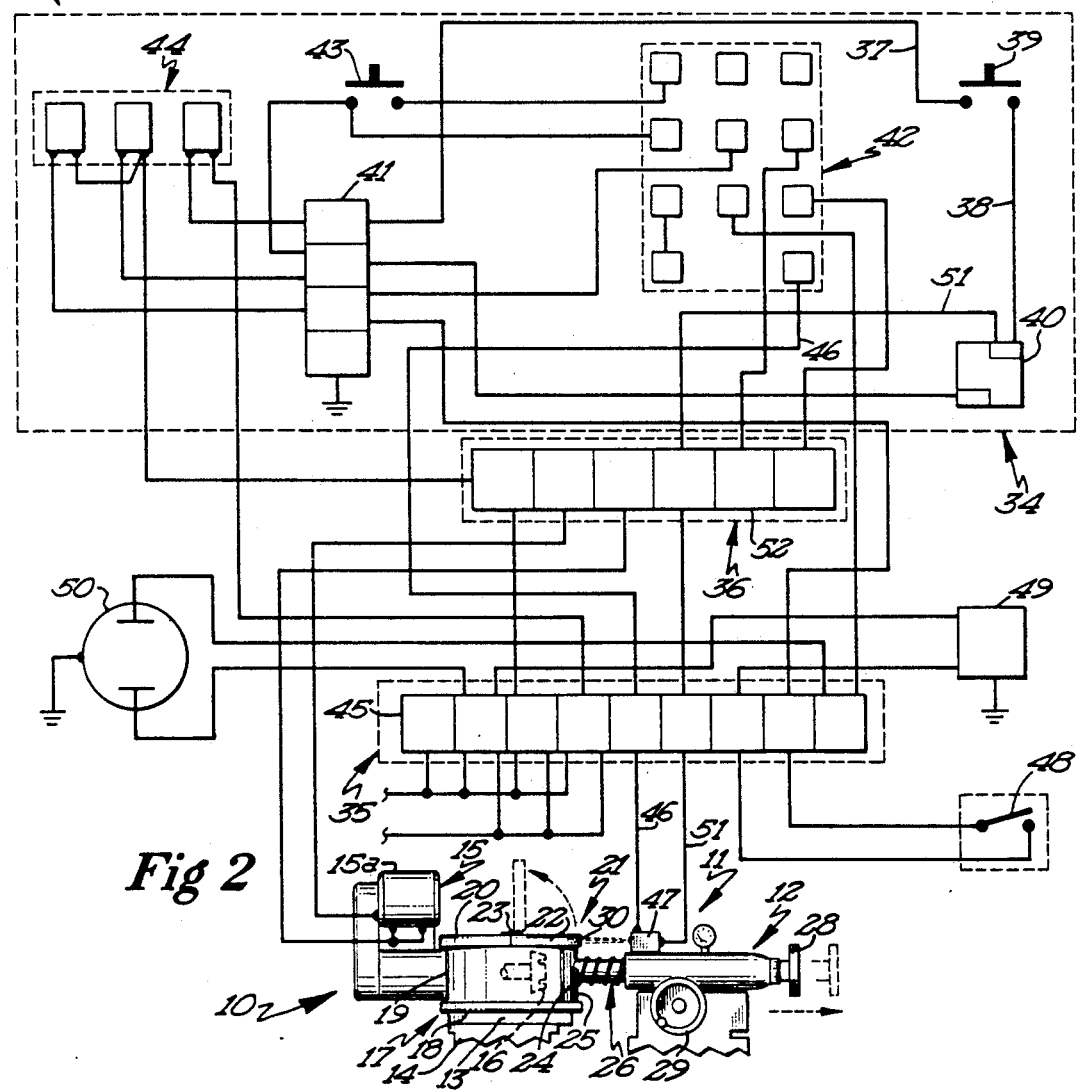

Referring now to FIG. 2, it will be seen that an electric schematic diagram of the electrical circuitry 33 for the lens generating apparatus is thereshown. The circuitry 33 includes an operating circuit 34, an optical sensing circuit 35, and a dynamic braking circuit 36. The operating circuit 34 is connected to a source of alternating electric current and includes main power conductors 37 and 38, which are connected to a main power switch 39. The conductor 37 is electrically connected to a terminal block 41, which is electrically connected to a normally closed control relay 42. A normally open start switch 43 is connected to control relay 42 and closed to reset the normally closed control relay 42 when the optical sensing circuit is opened.

The operating circuit is also provided with suitable circuit breakers 44. The operating circuit 33 is electrically connected by a conductor 46 to the terminal block 45 of the optical sensing circuit 35. The optical sensing circuit is provided with a photoelectric switch 47, which is disposed in opposed confronting relation with the photoelectric surface 30 of the cover plate 41. The optical sensing circuit also includes an on/off switch 48 and a normally closed solenoid 49 that is electrically connected to an electric motor driven pump 50, which controls the pivotal movement of the table 13 and the resulting sweeping action of the chamber structure and grinding tool relative to the lens blank on the collet.

The optical sensing circuit 35 is electrically connected by a conductor 51 to the dynamic electrical braking circuit 36. It is pointed out that the braking circuit 36 is commercially sold and, preferably, is the type manufactured and sold under the Trademark "THE BRAKE PAK" by Ambi-Tech. The braking circuit 36 is electrically connected to the quill motor 15a of the electric motor and high speed spindle unit 15 and is electrically connected to the control relay 42. It is pointed out that the braking circuit is provided with a full-wave rectifier (not shown), which is operative when the sensing circuit is opened. The full-wave rectifier will transmit a D.C. pulse or signal to the motor 15a to instantaneously brake operation of the motor and immediately stop rotation of the grinding tool 16.

It will be appreciated that the photoelectric switch 47 of the optical sensing circuit irradiates the photoelectric surface 30 of the arcuate flange 22 for the cover plate 21 and produces the well-known photoelectric effect to thereby energize the optical sensor circuit. It is pointed out that the focal length of the sensor circuit in the embodiment shown is approximately 5 inches so that the optical sensing circuit is de-energized and opened when the photoelectric switch exceeds the 5 inch distance. It is also pointed out that the arcuate length of the photoelectron surface 32 is of sufficient magnitude so that the chamber structure 17 can make its entire reciprocating sweep during the grinding operation and still present a photoelectric surface confronting the photoelectric switch within the focal length of the latter.

During operation of the apparatus, a lens blank 31 will be mounted on the collet 27, and the collet assembly will be advanced to the desired position within the grinding chamber structure so that the grinding tool will be able to generate the desired optical lens surface. The main power switch 39 and the sweep switch 48 will be closed to thereby energize the circuitry for the lens generating apparatus. The lens generator apparatus will continue to operate until the main power switch 39 is turned to the off position, or until the optical sensing circuit is opened because the cover plate 21 is raised, or if the collet is retracted beyond the focal length of the photoelectric switch 47. When either of these conditions occur, the circuitry 33 will be de-energized, but the braking circuit 36 will be effective to instantaneously brake the operation of the motor 15a to minimize or preclude any danger of the operator being injured by the grinding tool 16.

In this regard, when the optical sensing circuit is opened as a result of the cover plate being raised, or as a result of the collet and the photoelectric switch 47 being retracted beyond the focal length of the latter, the full-wave rectifier in the braking circuit will produce a momentary direct current pulse or signal to the motor 15a to instantaneously brake operation of the motor. When this occurs, the normally closed control relay 42 will open and must be reset by closing the normally opened start switch 43.

The lens generator apparatus 10 may be selectively used in a dry or wet grinding operation, while the dynamic braking system will minimize the occurrence of injury by a negligent operator.

From the foregoing, it will be seen that the dynamic braking circuit may be adapted to commercial lens generators to thereby render the operation of the lens generators less risky than has been heretofore known.

Thus, it will be seen that I have provided a novel dynamic electronic braking system, which functions in a more efficient manner than any comparable system.

What is claimed is:

1. In combination with a lens generating apparatus comprising a grinding tool assembly and a tailstock, said grinding tool assembly including a base having a table pivotally mounted thereon for pivotal movement relative thereto, a chamber structure and an electric motor mounted on the table for movement therewith, a revolvable grinding tool connected with the motor and projecting into the chamber, the chamber structure having a bottom wall, a top wall, and an upstanding vertical wall, an axis opening in the top wall and a cover hingedly mounted to the chamber structure for closing and opening the access opening, said cover having a photo-electric surface facing the tailstock, said tailstock including an elongate collet assembly for supporting a lens blank mounted on one end thereof, said collet assembly being shiftable between an extended position and a retracted position, the collet assembly, when in the extended position having said one end projecting into the chamber and, when in the retracted position, having said one end thereof located exteriorly of the chamber structure, an operating circuit electrically interconnecting the electric motor to a source of alternating electrical current, a master switch in said operating circuit and being shiftable between open and closed positions, an optical sensing circuit electrically connected to said operating circuit and including a photo-electric switch mounted on the tailstock and facing the photo-electric surface on said cover plate, said photo-electric switch being in current conducting relation when the cover plate is in the closed position and the collet assembly is in the advance position, said optical sensing circuit being interrupted and opening the operating circuit when the cover plate is opened or when the collet assembly is retracted a distance exceeding the sensing focal length of the photo-electric switch, and a dynamic breaking circuit electrically connected to the optical sensing circuit and producing a momentary direct current signal to the electric motor in response to interruption of the optical sensing circuit to thereby instantaneously stop operation of the motor and rotation of the grinding tool.

2. In combination with a lens generating apparatus comprising a grinding tool assembly and a tailstock, said grinding tool assembly including a base having a table pivotally mounted thereon for pivotal movement relative thereto, a chamber structure and an electric motor mounted on the table for movement therewith, a revolvable grinding tool connected with the motor and projecting into the chamber, the chamber structure having a bottom wall, a top wall, and an upstanding vertical wall, an axis opening in the top wall and a cover hingedly mounted to the chamber structure for closing and opening the access opening, said cover having an arcuate photo-electric surface facing the tailstock, said tailstock including an elongate collet assembly for supporting a lens blank mounted on one end thereof on one end thereof, said collet assembly being shiftable between an extended position and a retracted position, the collet assembly, when in the extended position having said one projecting into the chamber and, when in the retracted position, having said one end thereof located exteriorly of the chamber structure, an operating circuit electrically interconnecting the electric motor to a source of alternating electrical current, a master switch in said operating circuit and being shiftable between open and closed positions, an optical sensing circuit electrically connected to said operating circuit and including a photo-electric switch mounted on the tailstock and facing the photo-electric surface on said cover plate, said photo-electric switch being in current conducting relation when the cover plate is in the closed position and the collet assembly is in the advanced position, said optical sensing circuit being interrupted and opening the operating circuit when the cover plate is opened or when the collet assembly is retracted a distance exceeding the sensing focal length of the photo-electric switch, and a dynamic breaking circuit electrically connected to the optical sensing circuit and producing a momentary direct current signal to the electric motor in response to interruption of the optical sensing circuit to thereby instantaneously stop operation of the motor and rotation of the grinding tool.

3. The invention as defined in claim 2 wherein said cover is hingedly connected to the chamber structure for vertical swinging movement relative thereto between open and closed positions about a horizontal axis.

4. The invention as defined in claim 2 wherein said tailstock has an upper horizontal surface, and said photo-electric switch is mounted on said upper horizontal surface.

5. The invention as defined in claim 2 wherein said cover for said chamber structure has an arcuate flange integral therewith and depending therefrom, said arcuate flange having an outer surface defining said photo-electric surface.

* * * * *